Patented Mar. 18, 1941

2,235,784

UNITED STATES PATENT OFFICE 2,235,784

GLUCOSIDE ETHERS

Elwood V. White, Moscow, Idaho, assignor to The Dow Chemical Company, Midland, Mich., a corporation of Michigan No Drawing. Application September 13, 1939,
Serial No. 294,680

5 Claims. (Cl. 260—210)

This invention relates to new and useful glucosidic compounds.

It is an object of the invention to prepare new ethylated glucosides of a defined configuration, and specifically one in which the ethyl groups are in a plurality of the 2-, 3- and 6-positions in the glucose molecule.

Another object is to obtain new ethylated glucosides of the said configuration in which the glucoside group has a partial aromatic character.

The foregoing objects are attained by condensing ethylated glucose substituted in a plurality of the 2-, 3- and 6-positions, which may be obtained by a process as described in my co-pending application, Serial No. 294,679, filed concurrently herewith, with primary or secondary alcohol type bodies of a partial aromatic character. Such alcohol type substances fall into three general classes, viz., aryloxyalkanols, aralkanols, and cycloalkanols. Examples of aryloxyalkanols are the mono-phenyl, naphthyl, and halo-phenyl ethers of ethylene glycol and of propylene glycol. The aralkanols include benzyl alcohol, alpha-phenyl ethyl alcohol, beta-phenyl ethyl alcohol, and the like. The cycloalkanols include cyclopentanol, cyclohexanol and methyl cyclohexanol.

The new compounds have the general chemical formula

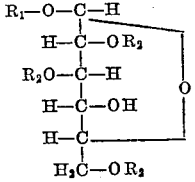

wherein $R_1$ is an aryloxy alkyl, aralkyl or cycloalkyl group and $R_2$ represents ethyl or hydrogen, a plurality of the $R_2$ groups being ethyl. The new compounds are typified by: beta-phenoxy ethyl 2.3-, 2.6-, and 3.6-diethyl glucosides and 2.3.6-triethyl glucoside, beta-phenyl and alpha-phenyl ethyl 2.3-, 2.6-, and 3.6-diethyl glucosides and the corresponding 2.3.6-triethyl glucosides, benzyl 2.3-, 2.6-, and 3.6-diethyl and 2.3.6-triethyl glucosides; p-tertiary-butyl phenoxy ethyl 2.3-, 2.6- and 3.6-diethyl glucosides and 2.3.6-triethyl glucoside; cyclohexyl 2.3-, 2.6-, and 3.6-diethyl and 2.3.6-triethyl glucosides; the naphthyloxy ethyl 2.3-, 2.6-, and 3.6-diethyl and 2.3.6-triethyl glucosides; phenoxy propyl 2.3-, 2.6-, and 3.6-diethyl and 2.3.6-triethyl glucosides; and the like.

They are all stable bodies and are plasticizers for organo-soluble cellulose ethers. Even the lower members of the class are substantially non-volatile and are permanent constituents of cellulose ether compositions when incorporated therein. The new compounds are particularly valuable intermediates in the preparation of technically valuable glucose ether-esters and of sorbitol ethers and sorbitol ether-esters.

The class embraces a large number of bodies representing a correspondingly wide range of useful properties. Substitution of tertiary alkyl groups in the para position of the aryl nucleus, as in the case of para-tertiary-butyl-phenoxy-ethyl 2.3.6-triethyl glucoside, gives products with good plasticizing properties. The esters derivable from such glucosides as intermediates and the sorbitol ethers and ether-esters derivable therefrom are of value in a variety of applications, as humectants, plasticizers, preservatives, etc.

The following examples illustrate the practice of the invention:

EXAMPLE 1

*Beta-phenoxy-ethyl 2.3.6-triethyl glucoside*

50 grams of 2.3.6-triethyl glucose are dissolved in 50 cc. of beta-phenoxy ethanol and 30 cc. of beta-phenoxy ethanol containing 5.5 per cent of dry hydrochloric acid gas are added. The mixture is warmed with occasiontal shaking for 1½ to 2 hours (until no Fehling's reaction is obtained on a sample of the mixture). After neutralization with barium carbonate and removal of the inorganic material, the solution is distilled under a pressure of 1–2 mm. mercury. The product, a light yellow oil, boils at 250° C. at 2 mm. and possesses the following additional characteristics:—ethoxy value, 44.8 per cent, refractive index, 1.4910 at 25° C., and density 1.100 at 25°/4° C.

EXAMPLE 2

*Phenyl ethyl 2.3.6-triethyl glucoside*

The preparation of this compound is carried out in a manner identical with that described in Example 1 except for using phenyl ethyl alcohol in the place of phenoxy ethyl alcohol. The syrupy product which is obtained in theoretical yield boils between 180°–200° C. at 2 mm. pressure. Other characteristics are: ethoxy value, 38.0 per cent, refractive index, 1.4862, and density, 1.080 at 25°/4° C.

EXAMPLE 3

*Preparation of cyclohexyl 2.3.6-triethyl glucoside*

In this preparation cyclohexanol is used in place of the phenoxy ethyl alcohol used in the experiment of Example 1. Conditions are otherwise the same. The product is a light colored slightly viscous liquid boiling at 190° C. at 2 mm., ethoxy value, 40.4 per cent, refractive index, 1.4645, and density, 1.052 at 25°/4° C.

EXAMPLE 4

A procedure similar to that described above using benzyl alcohol yielded benzyl 2.3.6-triethyl glucoside of boiling point 250° C. at 2 mm., refractive index, 1.4891 at 25° C., ethoxy value, 38.1 per cent.

EXAMPLE 5

In like manner, para-tertiary butyl phenoxy ethanol is reacted with 2.3.6-triethyl glucoside in the presence of hydrogen chloride to give para-tertiary butyl phenoxy ethyl 2.3.6-triethyl glucoside, the ethoxy value of which is 30.7 per cent.

I claim:

1. A compound of the formula

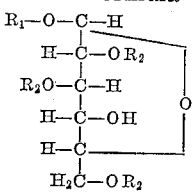

wherein $R_1$ is a member of the class consisting of the aralykyl, aryloxy alkyl and cycloalkyl radicals, and where a plurality of the groups designated as $R_2$ are ethyl radicals, the remainder being hydrogen.

2. A compound having the general formula

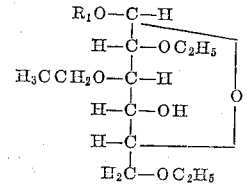

wherein $R_1$ is selected from the group consisting of the aralkyl, aryloxy alkyl, and cycloalkyl radicals.

3. A new compound, beta-phenoxy ethyl 2.3.6-triethyl glucoside.

4. A new compound, benzyl 2.3.6-triethyl glucoside.

5. A new compound, cyclohexyl 2.3.6-triethyl glucoside.

ELWOOD V. WHITE.